Aug. 29, 1944.   J. ROBINSON   2,357,060
RATE OF ASCENT AND DESCENT INDICATOR FOR AIRCRAFT
Filed Aug. 21, 1942
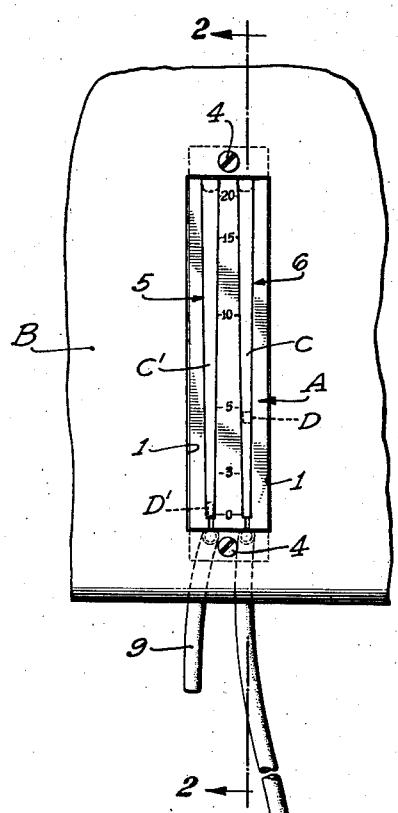
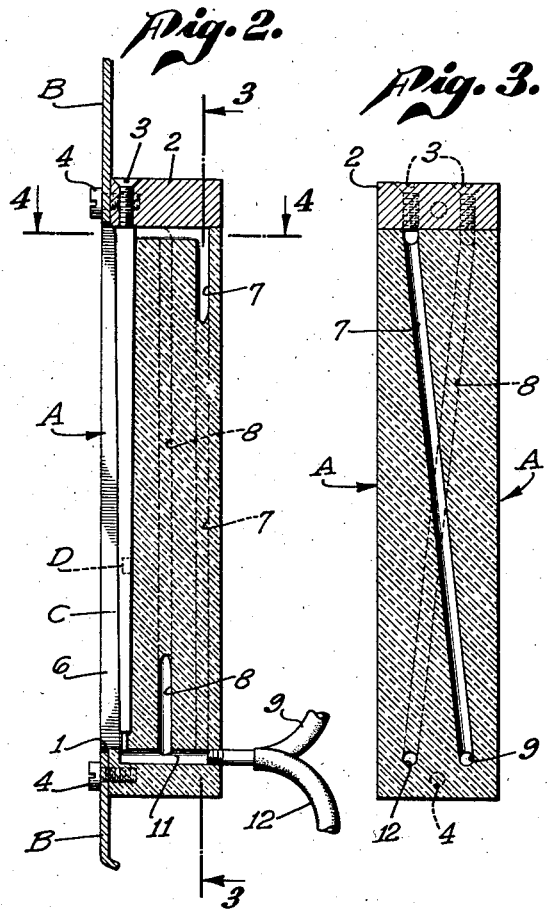
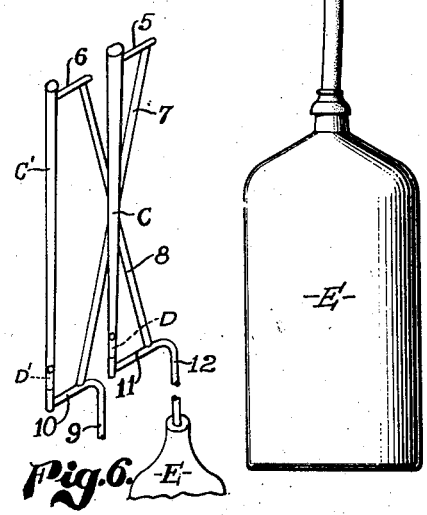
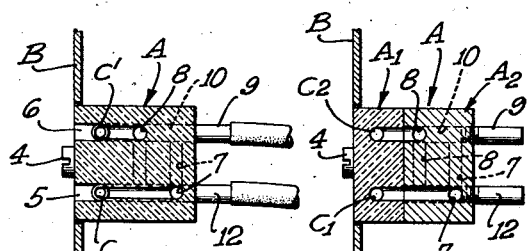
INVENTOR.
JOHN ROBINSON,
BY
ATTORNEY.

Patented Aug. 29, 1944

2,357,060

UNITED STATES PATENT OFFICE 2,357,060

RATE OF ASCENT AND DESCENT INDICATOR FOR AIRCRAFT

John Robinson, Altadena, Calif.

Application August 21, 1942, Serial No. 455,645

10 Claims. (Cl. 73—179)

This invention comprehends the provision of an improved type of rate of ascent and descent indicator or variometer, adapted for use on different types of aircraft, such as planes and gliders, and comprises means for visibly indicating to pilots of such craft the rate of change of altitude of the craft by utilizing prevailing atmospheric pressures as the plane transverses or soars through different "thermals."

While I am aware that certain types of indicators for similar purposes have been heretofore known, it is an object of this invention to provide a new type of indicator of extremely sensitive characteristics, simple structure, low cost and ready adaptability to modern aircraft.

A primary object is to provide an indicator for aircraft, preferably including a pair of tubes, each of which is open at one end to the atmosphere and at its opposite end is in communication with an air container sealed against the atmosphere except through said tubes, and an indicating element movably disposed in each of said tubes and responsive to the flow of air through the tubes which is occasioned by pressure resident in said container, and to the prevailing atmospheric pressure, under varying conditions, for visibly indicating to a pilot the rate of ascent or descent, as the case may be, as measured in units per second or otherwise.

Other objects may appear as the description of my invention progresses.

I have shown a preferred form of my invention with minor modifications in the accompanying drawing, subject to further modification, within the scope of the appended claims, without departing from the spirit of the invention.

In said drawing:

Fig. 1 is a front elevation of my improved indicator mounted for use on an instrument board of an airplane or glider;

Fig. 2 is a sectional elevation of the same on line 2—2 of Fig. 1;

Fig. 3 is a sectional elevation on line 3—3 of Fig. 2;

Fig. 4 is a transverse section on line 4—4 of Fig. 2 showing a solid body; and

Fig. 5 is a similar section in the plane of Fig. 4 showing a body formed of a transparent front section and a rear section of wood or other material.

Fig. 6 is a diagrammatic view showing the connections between the several parts of the indicator for accomplishing the desired results.

Briefly described, my device includes a body A either formed of a solid block of material such as plastic and of the general form illustrated in Figs. 2 and 4, or of a front transparent plastic section $A_1$ and a mating section $A_2$ of wood or other material as illustrated in Fig. 5 in which last mentioned case the two sections $A_1$ and $A_2$ are suitably attached together. Body A is attachable to a panel or instrument board B preferably in flush position as shown in Figs. 1 and 2 so that the forward portions of the body will seat in an opening 1 formed in the board B. The body A preferably has a removable top section 2 which is glued to the body and the assembled indicator unit is held on the instrument panel B by means of screws 4, 4 extended through the panel and into section 2 and the bottom of body A, respectively.

With particular reference to Figs. 1 to 4, inclusive, it will be observed that the front of body A has a pair of vertical grooves formed therein, as at 5 and 6 in which glass tubes C and C' are respectively mounted. Said tubes are of similar length and cross section and have internal tapered passages therein with the major diameters thereof at their upper extremities and the minor diameters at their lower extremities. The gradually increasing areas of the tubes C and C' upwardly permit the air to flow upwardly in said tubes around the peripheries of elements D and D', respectively, in gradually increasing volume as said elements rise in the tubes.

Body section 2 has screws 3 which register with the upper ends of tubes C and C' for the purpose of affording access to the tubes.

For the purpose of brevity the tube C will be hereinafter referred to as the "up" tube and the tube C' as the "down" tube and for the purpose of this disclosure, passages $A_3$ and $A_4$ illustrated in Fig. 5 will be treated as the equivalents of the tubes C and C'.

Cylindrical pellets D and D' are movably supported in the tubes C and C' under the influence of air directed thereagainst either from the external atmosphere or that from an air container which is sealed against the external atmosphere except through said tubes. Pellet D in the up tube C is preferably green and pellet D' in the down tube C' is red for, respectively and differently indicating the rate of ascent and descent as measured in feet per second or otherwise. To such end the front surfaces of the body A may have numerals at graduated distances thereon which represent units of measurement and the exposed portions of the tubes C and C' may have marks which are calibrated to match the designating numerals, in order that a pilot of an aircraft equipped with the indicator may readily determine and be guided by the indicated rate of ascent or descent. The pellets D and D' serve as closures for the lower ends of their respective tubes and as they ascend in their tubes air in gradually increasing volume is permitted to flow around the peripheries of the pellets, due to the gradually increasing diameter of the passages in the tubes from their lower extremities upwardly.

The top end of the up tube C and the bottom end of the down tube C' are arranged for communication with the external atmosphere while the bottom end of the up tube and the top end of the down tube are arranged for communication with the sealed air container E. Thus, when the atmospheric pressure changes, the air flowing into or out of the container E will cause the pellet D to ascend in tube C if the external pressure is decreasing and the pellet D' to ascend in tube C' if the external pressure is increasing.

Hence, a passage 7 is formed in body A and leads from the top of tube C to a vent 9 to the external atmosphere while the bottom of tube C' is directly connected with said vent by means of a passage 10 at the bottom of body A. The top of tube C' is similarly connected with a passage 8 leading to a bottom passage 11 which in turn connects with a flexible tube 12 leading to container E. The bottom of tube C is also connected with tube 12 through passage 11.

Now, referring to Fig. 5, it will be noted that in lieu of the tubes C and C', I have merely provided vertical tapered passages in the body member A₁ while the passages 7 and 8 are formed in the back section A₂ as well as the interconnecting passages shown in Fig. 4. The necessary numerals and graduations for indicating units of ascent and descent in feet per second or otherwise, may be formed on the front surface of the body in the last mentioned form of device.

In operation, with air in the container E at the prevailing pressure of the atmosphere at a starting point, as the aircraft ascends the prevailing external pressure will gradually decrease and due to the greater pressure in container E the pellet D will rise in the up tube C until pressure from the atmosphere balances the pressure from the container, due regard being given to the fact that air in gradually increasing volume escapes around the pellet D as the rate of ascent is increased. The units of measurement of the rate of ascent of the aircraft are indicated on the face of the instrument by the position of the pellet D at all times, and the difference between the pressure in container E and the external pressure influences and determines the position of the element D in tapered tube C.

When the aircraft is descending, the prevailing pressure in container E being less than that of the external atmosphere, the greater external pressure will serve to cause the pellet D' in tube C' to rise gradually as the external pressure increases, and thereby indicate the rate of descent. The pellets D and D' serve as valves at the bottoms of their tubes C and C', respectively, and it will be apparent that when pellet D is ascending in tube C the pellet D' will be held seated at the bottom of tube C', and vice versa. As the elements D and D' rise in their respective tubes C and C' the clearance between the elements and the walls of their passages gradually increases, thus allowing increasingly greater volumes of air to flow therearound, while still holding the elements suspended in their tubes at variable points corresponding to the air flow through the tubes.

What I claim is:

1. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft.

2. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, said passages being of gradually increasing area from their lower extremities to their upper extremities, whereby the movement of said elements in said passages serves to regulate the flow of air around the elements for correspondingly varying the rate of ascending and descending indications of the craft.

3. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, said passages having a minor area in the lower extremities thereof and adapted to be closed thereat by said elements under variable operating conditions.

4. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, the elements in said passages being of different characteristics for separately indicating the rate of ascent and descent.

5. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, said body having at least portions thereof adjacent said passages through which said elements are visible to a pilot.

6. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, said body having calibrations thereon for registration with said elements whereby movement of the elements relative to said calibrations serves to indicate corresponding ascending and descending speeds of the craft.

7. A rate of ascent and descent indicator for aircraft comprising: a body having a pair of passages therein, elements movably disposed in said passages which are responsive to changes in atmospheric pressure, opposite extremities of said passages being open to the atmosphere in which the craft is situate, an air container sealed against the prevailing atmosphere and connected with the other extremities of said passages and open to the atmosphere only through said passages, selectively, depending upon the ascent or descent of the craft, the movement of said elements under variable atmospheric pressures serving to indicate the vertical speed of the craft, said container beng adapted to hold air at a pressure in excess of or less than that of the prevailing atmosphere at the resident elevation of the craft for effecting an outflow of air from the container upon the ascent of the craft and an inflow of air upon the descent thereof to control the operation of said elements.

8. A rate of ascent and descent indicator for aircraft comprising: a pair of tapered tubes adapted to function as ascending and descending rate of speed indicating units, respectively, the top of the ascending unit tube and the bottom of the descending unit tube being open to the atmosphere, a sealed air container connected with the top of the descending unit tube and the bottom of the ascending unit tube, and elements movable in said tubes in response to the influence of the external atmospheric pressure, and the pressure in said container for indicating the rate of ascent and descent at varying elevations by reason of the correspondingly varying positions of said elements in said tubes.

9. A rate of ascent and descent indicator for aircraft comprising: a pair of tapered tubes adapted to function as ascending and descending rate of speed indicating units, respectively, the top of the ascending unit tube and the bottom of the descending unit tube being open to the atmosphere, a sealed air container connected with the top of the descending unit tube and the bottom of the ascending unit tube, and elements movable in said tubes in response to the influence of the external atmospheric pressure, and the pressure in said container for indicating the rate of ascent and descent at varying elevations by reason of the correspondingly varying positions of said elements in said tubes, each of said elements adapted to normally close at the bottom of its associated tube when the other element is rising in its tube.

10. A rate of ascent and descent indicator for aircraft comprising: a body having a pair of air passages therein of gradually increasing area from their lower to their upper extremities, an indicating element in each passage movable in response to the flow of air in its passage, an air container sealed against the prevailing atmosphere and connected with the upper extremity of one passage and the lower extremity of the other passage, whereby when the air pressure on opposite sides of said indicating elements is equalized the force of gravity will be effective for seating said elements in the minor extremities of their respective passages but when a difference in pressure is occasioned between the prevailing atmosphere in which the air craft is situate and that in said container said indicating elements will respond to such difference in pressure by movement upwardly or downwardly in their passages as influenced by the ascent or descent of the air craft.

JOHN ROBINSON.